(12) United States Patent
Yamagiwa et al.

(10) Patent No.: US 6,220,757 B1
(45) Date of Patent: Apr. 24, 2001

(54) SLIDING PART FOR A SLIDING MECHANISM

(75) Inventors: Masamichi Yamagiwa; Takao Nishioka, both of Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/300,354

(22) Filed: Apr. 27, 1999

(30) Foreign Application Priority Data

Apr. 30, 1998 (JP) .................................................. 10-120935

(51) Int. Cl.[7] ...................................................... F16C 17/00
(52) U.S. Cl. ............................................... 384/42; 384/285
(58) Field of Search .............................. 384/42, 95, 129, 384/240, 243, 276, 282, 284, 285, 293, 297, 303, 306, 309, 312, 420, 428

(56) References Cited

U.S. PATENT DOCUMENTS

| | | |
|---|---|---|
| 2,609,710 | 9/1952 | Osborn . |
| 5,342,129 * | 8/1994 | Dennis et al. ........................ 384/420 |
| 5,829,881 * | 11/1998 | Furlani et al. .......................... 384/42 |
| 5,927,860 * | 7/1999 | Buse ................................. 384/285 X |

FOREIGN PATENT DOCUMENTS

| | | |
|---|---|---|
| 0209697 | 1/1987 | (EP) . |
| 0572112 | 12/1993 | (EP) . |
| 0651140 | 5/1995 | (EP) . |
| 2151742 | 7/1985 | (GB) . |
| 58-210308 | 12/1983 | (JP) . |
| 8-109956 | 4/1996 | (JP) . |

\* cited by examiner

Primary Examiner—Thomas R. Hannon
(74) Attorney, Agent, or Firm—W. F. Fasse; W. G. Fasse (57) ABSTRACT

First and second sliding parts of a sliding mechanism slide relative to each other. The first sliding part is held in a recess of a metal holding member, which is bounded by an inner wall that meets an open end of the recess along an edge. The first sliding part has a first side surface portion that contacts the inner wall in the recess away from the edge, and a second side surface portion displaced inwardly away from the inner wall so as not to contact the holding member at the edge. By this structure, generation of stress concentration on the sliding part can be avoided.

14 Claims, 8 Drawing Sheets

SLIDING PART FOR A SLIDING MECHANISM

BACKGROUND OF THE INVENTION

1. Field of the Invention

The present invention relates to a sliding part having a sliding surface of which wear resistance is required, such as a shim used in a valve system of an internal combustion engine of a vehicle, and to a sliding mechanism including the sliding part.

2. Description of the Background Art

A material having high wear resistance has been used for a mechanical sliding part represented by an engine part of a vehicle, in order to minimize wear. Recently, a hard sliding member comes to be formed of a material such as a super hard alloy, or ceramics having superior wear resistance as compared with the steel material which has been conventionally used as a material for the sliding part. These materials, however, are generally difficult to process and are expensive. Therefore, it is a common practice to form not the entire part but only a sliding portion requiring high wear resistance by using such a material.

As a representative example, on an end surface of a valve lifter driving a tappet valve of a valve system in the internal combustion engine, a shim formed of a hard member is positioned, which shim exhibits superior wear resistance.

As an example of a sliding mechanism for heavier load, a hard member is used at a tip end of a thrust bolt used for preventing inclination of a ring gear in a reduction mechanism of a vehicle. For example, Japanese Patent Laying-Open No. 8-109956 discloses means having superior durability and allows easy maintenance, for preventing inclination of the ring gear used in a reduction mechanism of a large vehicle such as a bus, a truck, a tractor or the like.

Figure 10A:
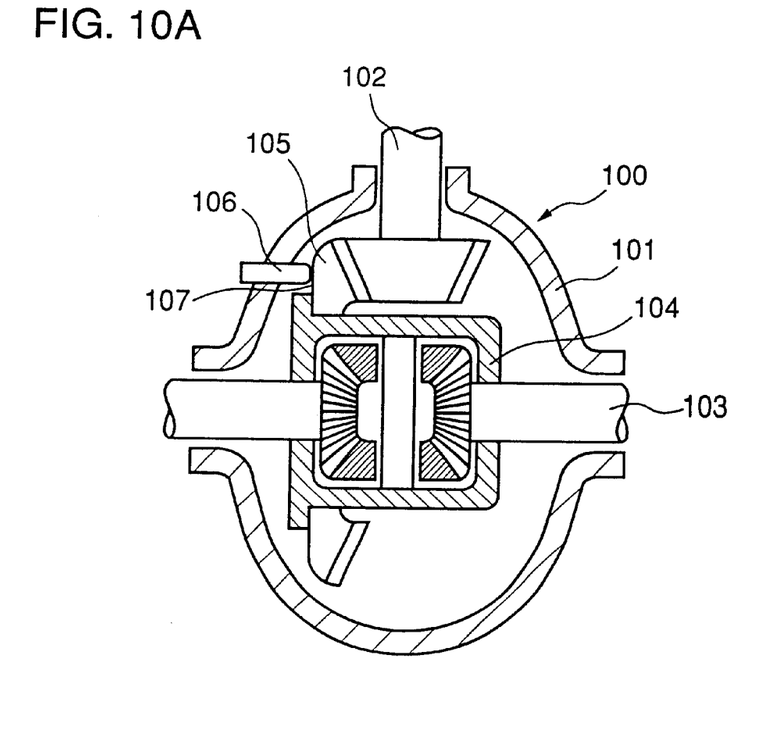
FIG. 10A is a cross section of an overall reduction mechanism of the prior art.

Referring to FIG. 10a, a reduction mechanism 100 contains, in a differential carrier 101, a propeller shaft 102 including a pinion, and an axle shaft 103 including a differential gear with a bearing (not shown) interposed. In a differential case 104, a ring gear 105 is secured. Ring gear 105 transmits torque of propeller shaft 102 to axle shaft 103. In order to prevent deflection of ring gear 105 when the transmitted torque increases, a tip end of a thrust bolt 106 is in contact with a rear surface 107 of ring gear 105.

Figure 10B:
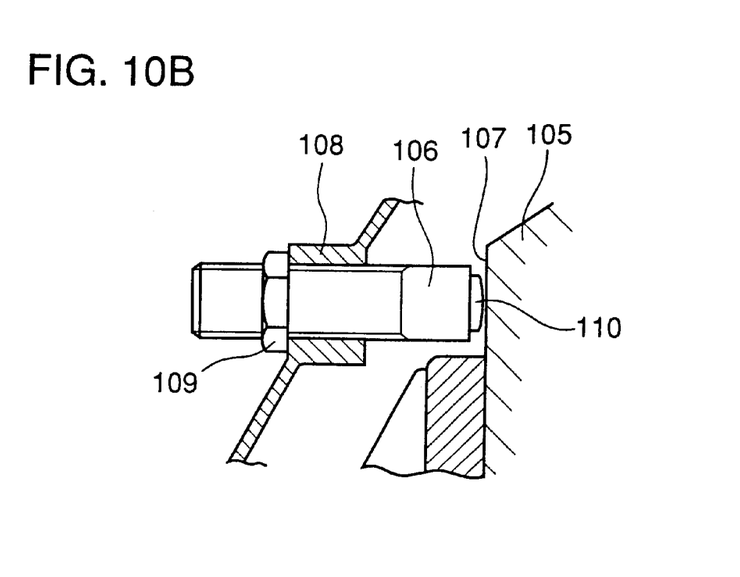
FIG. 10B is a cross section representing positional relation between the thrust bolt and the ring gear.

FIG. 10B is an enlarged view of a portion around thrust bolt 106 and rear surface 107 of ring gear 105. A boss 108 is provided at a part of differential carrier 101, thrust bolt 106 is screwed in boss 108, and thrust bolt 106 is positioned by using a lock nut 109. At a tip end of thrust bolt 106, a sliding part 110 is mounted.

Figure 10C:
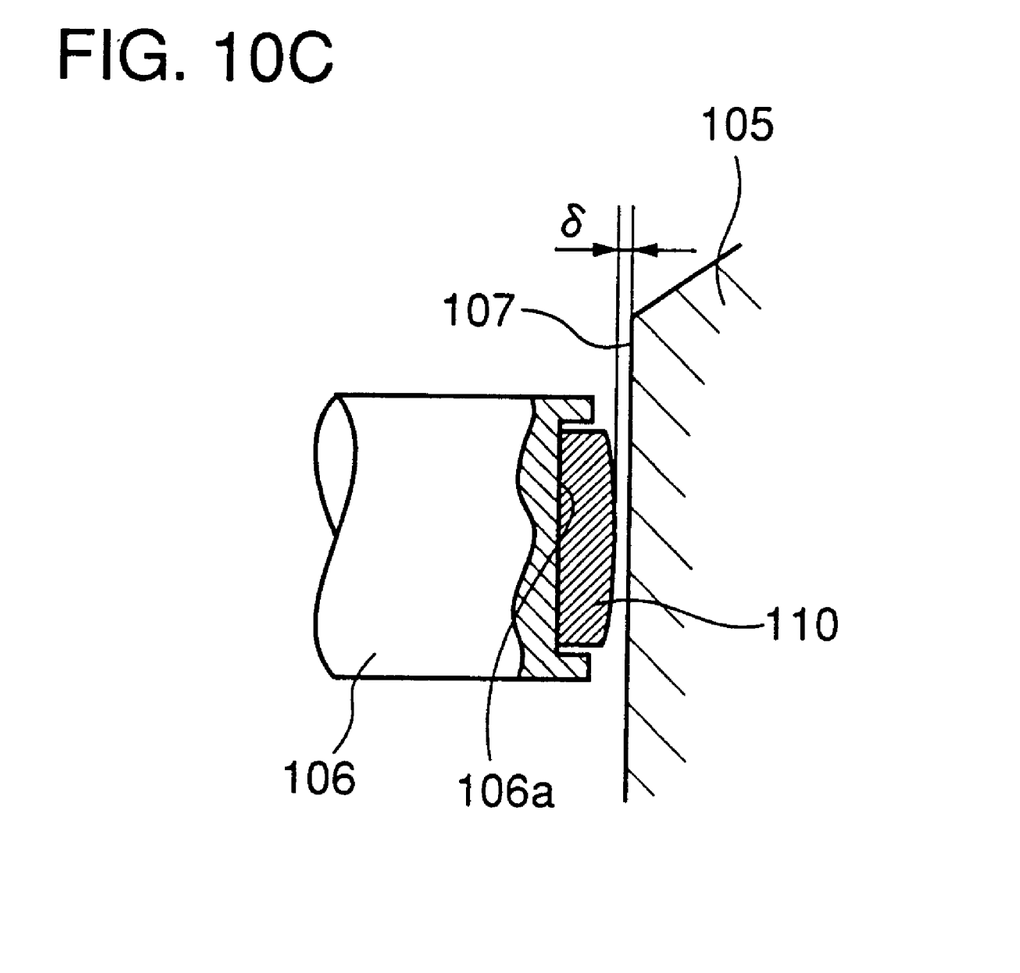
FIG. 10C is a cross section of a sliding part seated in a recessed portion of the thrust bolt.

FIG. 10C shows, in further enlargement, the periphery of sliding part 110. Sliding part 110 having a sliding surface crowned to have a convex shape and formed of silicon nitride or the like is mounted on a recessed portion 106a of thrust bolt 106. Between the sliding surface of sliding part 110 and rear surface 107 of ring gear 105, there is generally a clearance of δ. When an excessive torque is transmitted to reduction mechanism 100 and ring gear 105 deflects by more than δ when the vehicle starts or climbs a steep slope, thrust bolt 106 prevents inclination of more than δ. Therefore, during normal running, sliding part 110 does not contact rear surface 107 of ring gear 105.

By the structure of the reduction mechanism, inclination of ring gear 105 by more than δ can be prevented, and therefore abnormal wear of ring gear 105 and the teeth surface of the pinion of propeller shaft 102 or damage to the teeth can be avoided. Further, as the sliding surface of sliding part 110 is crowned to have a convex shape, sliding part 110 is in smooth contact with the rear surface 107 of ring gear 105, and therefore it is described that a force that would cause damage or displacement of sliding part 110 from the recessed portion 106a is hardly generated.

SUMMARY OF THE INVENTION

An object of the present invention is to employ a holding portion formed of metal having such a shape that prevents generation of stress concentration on the sliding part, when the holding portion holds the sliding part formed of ceramics.

The above described object can be attained by the sliding part of a sliding mechanism in accordance with the present invention in which one of sliding parts sliding relative to each other is held by a holding portion formed of metal, the sliding part being arranged protruding from a recessed portion provided in the holding portion, and a side surface of the sliding part being apart from an open end of an inner wall of the recessed portion so as not to be in contact with an edge of the open end.

As to the manner of holding the sliding part in the holding portion, the sliding part may be inserted loose in the recessed portion of the holding portion, or preferably, held by shrink fit or press fit.

If the side surface of the sliding part not in contact with the edge of the open end of inner wall at the recessed portion of the holding portion is formed linear or curved, stress concentration at the contact portion between the holding portion and the sliding part can be relaxed.

When the sliding member is formed of ceramics, preferably, the ceramics should be a silicon nitride based ceramics of which bending strength is preferably reinforced to 1000 MPa to 2000 MPa, so that the sliding member can withstand impact load.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment in which the sliding part in accordance with the present invention is used in a valve system of an internal combustion engine of which contact force Q is relatively small, and an embodiment in which the sliding part is used in a mechanism for preventing inclination of the ring gear of which contact surface pressure is relatively high, such as a reduction mechanism of a vehicle, will be described in the following.

First Embodiment

Figure 1:
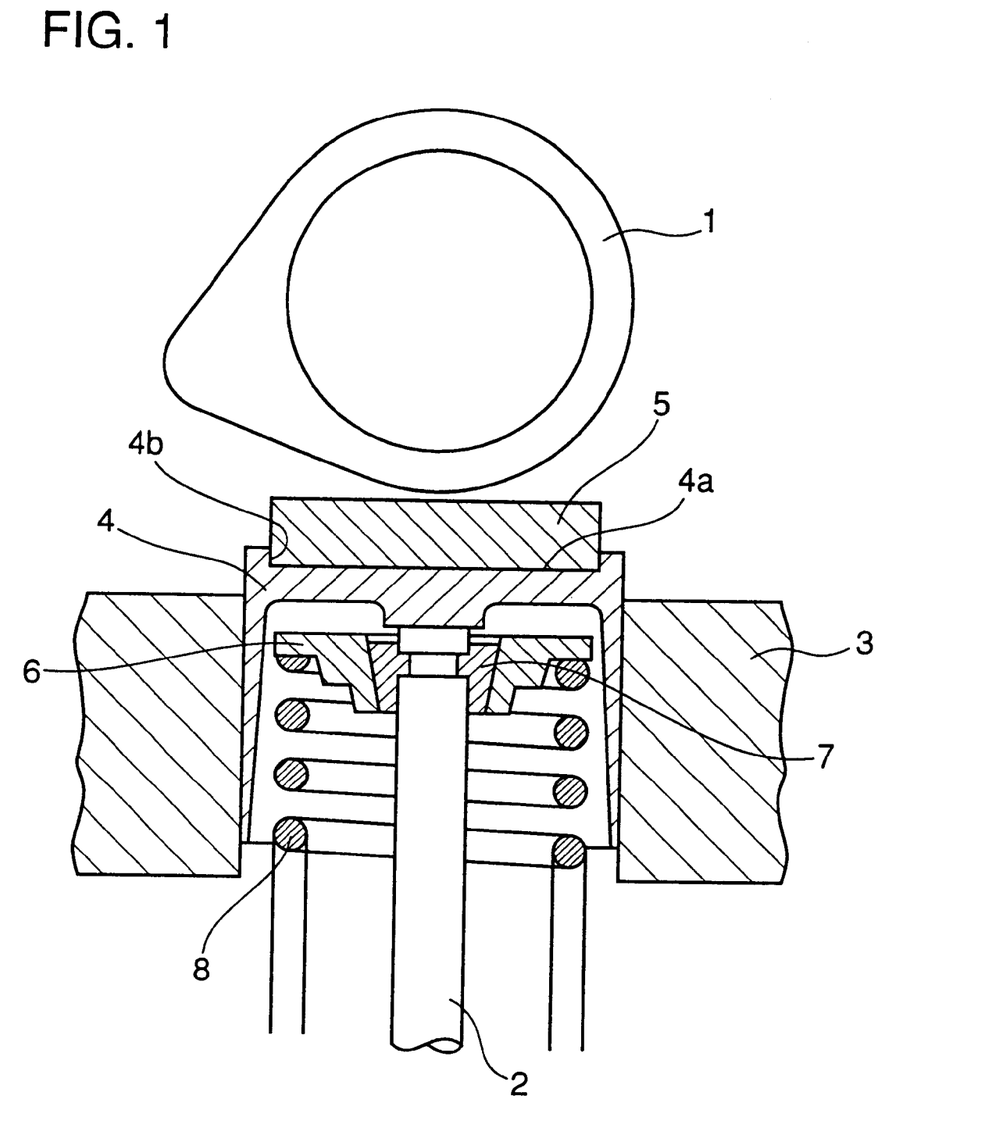
FIG. 1 is a partial cross section of a sliding part in accordance with an embodiment of the present invention used in a valve system of an internal combustion engine.

FIG. 1 is a partial cross section representing behavior of a shim and a cam when the sliding part in accordance with an embodiment of the present invention is used in the valve system of an internal combustion engine. A valve 2 reciprocates along the profile of cam 1 with respect to the combustion chamber (not shown) of the engine, as cam 1 rotates. On an end surface of a valve lifter 4 slidably supported on a cylinder block 3, a recessed portion 4a is provided, in which a shim 5 as the sliding part is seated. Shim 5 is a member for maintaining precision in opening and closing operation of valve 2, by canceling accumulated error of parts such as cam 1 and valve lifter 4, by the adjustment of its thickness. In order to facilitate changing of shim 5, shim 5 is generally inserted loose on the inner wall 4b of recessed portion 4a. An end portion of valve 2 secured by means of a cotter 7 on spring retainer 6 is constantly biased by a spring 8 to be in contact with an inside of valve lifter 4.

Figure 2:
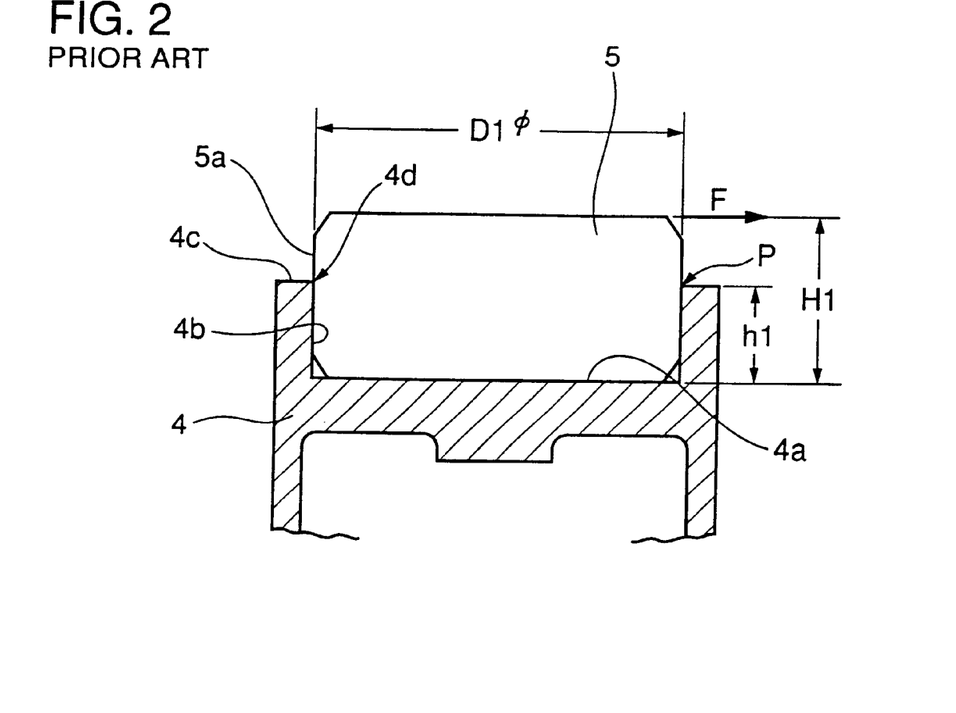
FIG. 2 is a cross section of a conventional sliding part seated in a recessed portion of a holding portion of a valve system in a conventional internal combustion engine.

FIG. 2 shows a conventional manner of placing shim 5 as the sliding part in the recessed portion 4a of valve lifter 4 as the holding portion formed of metal. Referring to FIG. 2, the inner wall 4b of the recessed portion 4a of valve lifter 4 rises vertically to reach open end 4c. Side surface 5a of shim 5 is also a vertical column. Therefore, when there is generated a tangential force F by sliding friction between cam 1 and shim 5, there is generated the stress concentration at the side surface 5a of shim 5 at the point P on edge 4d of open end 4c of valve lifter 4. Even when the inside of edge 4d is chamfered, it simply means that the point P moves. When the stress concentration generates on the side surface 5a of shim 5, valve lifter 4 formed of metal is deformed, whereas shim 5 formed of ceramics does not deform, and therefore shim 5 is fragile and prone to chipping.

Figure 3:
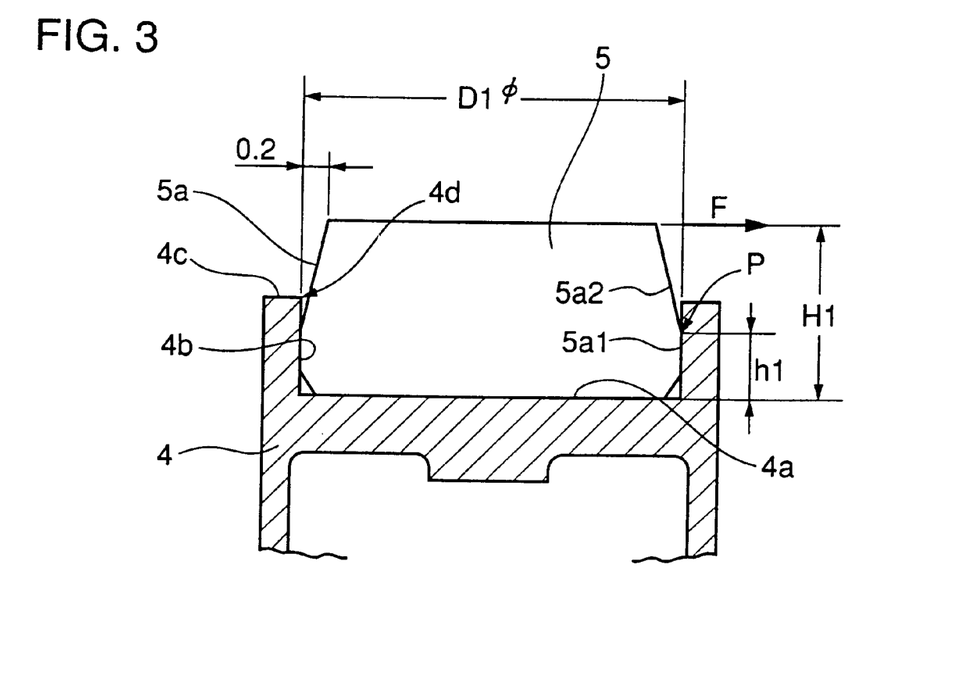
FIG. 3 is a cross section of a sliding part having a linearly inclined side surface in accordance with an embodiment of the present invention seated in a recessed portion of a holding portion of a valve system in an internal combustion engine.
Figure 4:
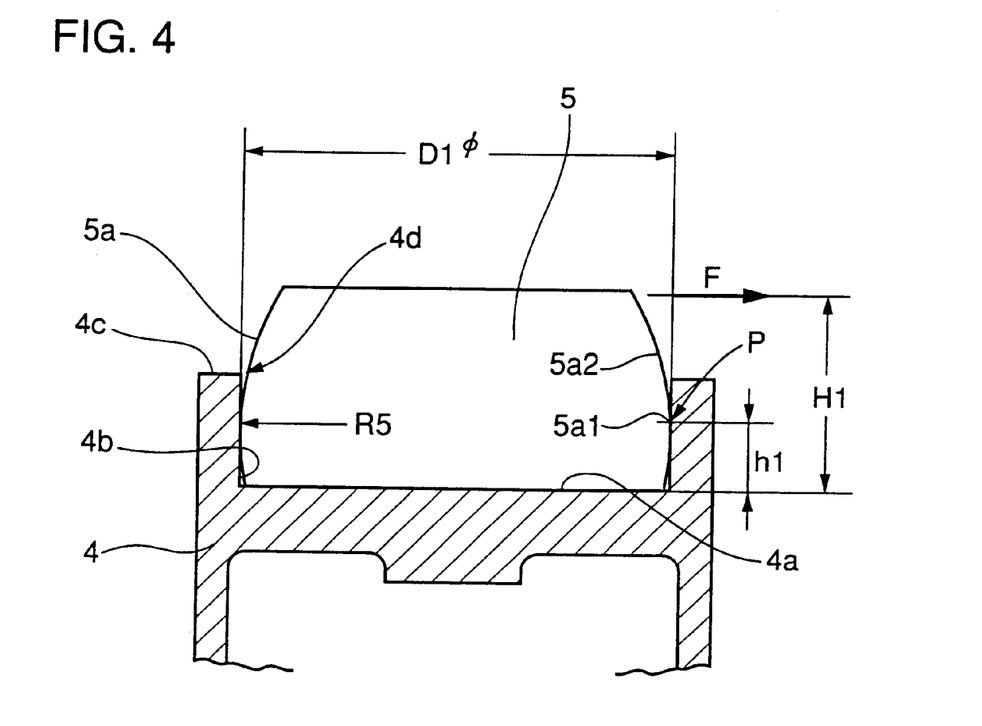
FIG. 4 is a cross section of a sliding part having curved columnar side surface in accordance with an embodiment of the present invention seated in a recessed portion of a holding portion of a valve system in an internal combustion engine.

In order to avoid such stress concentration, in the present embodiment, the side surface 5a of shim 5 as the sliding part includes a first side surface portion 5a1 that is adapted to be in contact with the inner wall 4b, and a second side surface portion 5a2 that extends smoothly from the first side surface portion 5a1 and that is adapted not to be in contact with edge 4d of open end 4c of the recessed portion 4a, as shown in FIGS. 3 and 4. Accordingly, even when there is generated the tangential force F, the contact point P is below the open end 4c, and therefore edge 4d of inner wall 4b of open end 4c is not directly brought into contact with side surface 5a of shim 5. Therefore, stress concentration at side surface 5a of shim 5 at point P can be relaxed. FIG. 3 represents an embodiment in which side surface 5a includes linear side surface portions 5a1 and 5a2, and FIG. 4 shows an embodiment in which the side surface is curved, i.e. the side surface portions 5a1 and 5a2 are each curved to form a continuous overall curve of side surface 5a.

EXAMPLES

Evaluation of shapes and effects of commercially available shims 5 formed of steel material and of shims 5 processed as sliding parts having such shapes as shown in FIGS. 2 to 4 using commercially available super hard alloy such as cermet and ceramics such as silicon nitride, alumina and zirconia will be described in the following.

Figure 5:
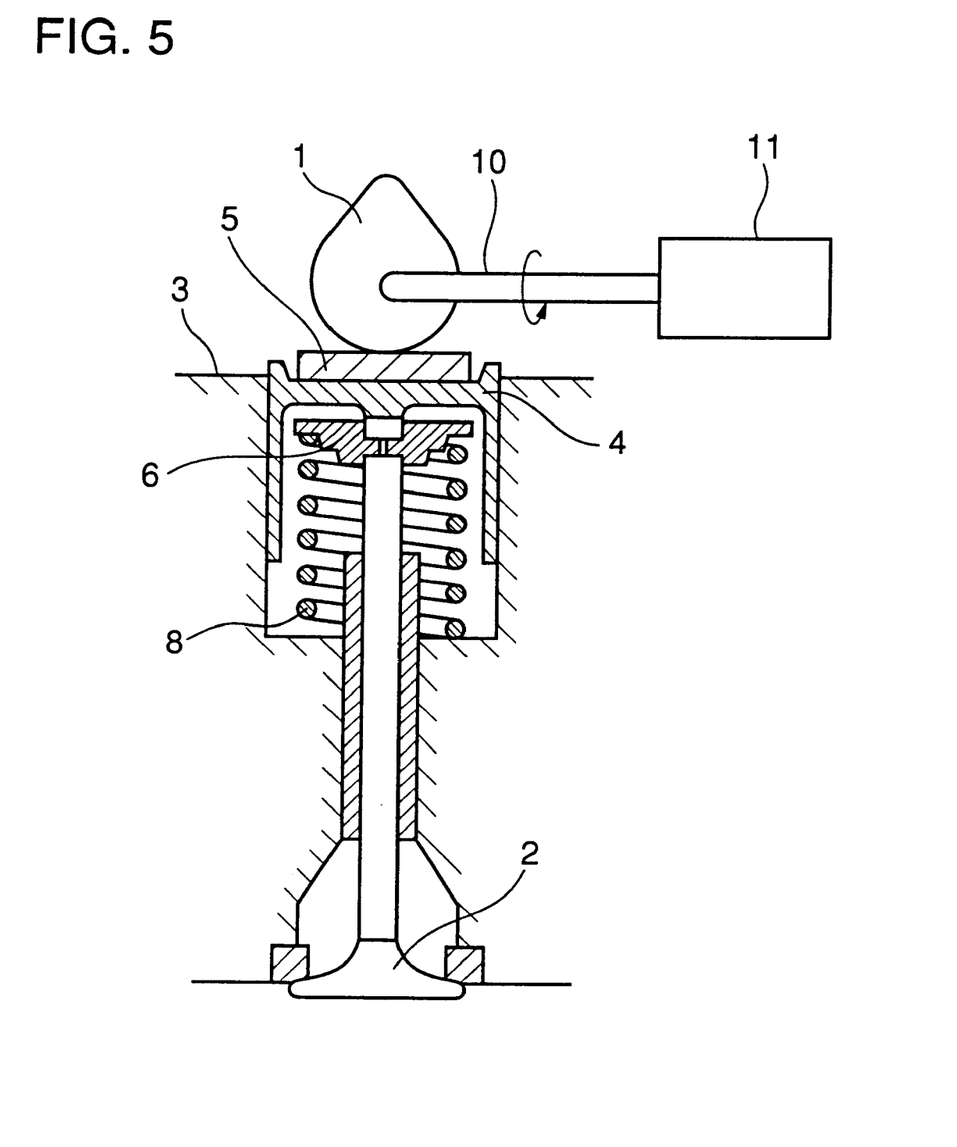
FIG. 5 is a schematic illustration of a test apparatus for a sliding part, simulating the valve system of an internal combustion engine.

FIG. 5 is a schematic illustration of the test apparatus. The test apparatus includes a commercially available 4-cylindered, 1500 cc valve system, having a motor 11 for driving a cam shaft 10 attached thereto, and separately having a pump (not shown) for supplying a lubricating oil. Using the test apparatus, a durability test of shims 5 was performed for 200 hours at a cam shaft rotation speed of 2250 rpm, and the amounts of wear of the shims 5 were measured. The sliding surfaces of shims 5 were finished flat to have the surface roughness of $R_a$=0.2 μm.

The dimension of conventional shim 5 shown in FIG. 2 was as follows: D1φ=28 mm, h1=2.5 mm, H1=2.9 to 3.4 mm (optimal value of H1 is selected to maintain precision in opening/closing valve 2), and both side surfaces 5c were chamfered by 0.2 mm. The dimension of shim 5 in accordance with the embodiment of the present invention was as follows: D1φ=28 mm, h1=2.0 mm, H1=2.9 to 3.4 mm. The dimension of shim 5 in accordance with an embodiment shown in FIG. 4 was similar to that of FIG. 3. The results of evaluation of respective shims by the test apparatus shown in FIG. 5 are as shown in Table 1.

TABLE 1

| Sample No. | Shim 5 as Sliding Part | | |
|---|---|---|---|
| | Material | Shape | Result of Durability Test |
| 1 | Steel | FIG. 2 | Shim Wear; 52 μm |
| 2 | Super Hard Alloy | Same as above | Broken from point P after 50 hours |
| 3 | Silicon Nitride | Same as above | Broken from point P after 62 hours |
| 4 | Zirconia | Same as above | Broken from point P after 73 hours |
| 5 | Alumina | Same as above | Broken from point P after 54 hours |
| 6 | Steel | FIG. 3 | Shim Wear; 50 μm |
| 7 | Super Hard Alloy | Same as above | Shim Wear; 5 μm |
| 8 | Silicon Nitride | Same as above | Shim Wear; 3 μm |
| 9 | Zirconia | Same as above | Shim Wear; 2 μm |
| 10 | Alumina | Same as above | Shim Wear; 8 μm |
| 11 | Steel | FIG. 4 | Shim Wear; 48 μm |

TABLE 1-continued

| Sample | Shim 5 as Sliding Part | | |
|---|---|---|---|
| No. | Material | Shape | Result of Durability Test |
| 12 | Super Hard Alloy | Same as above | Shim Wear; 4 μm |
| 13 | Silicon Nitride | Same as above | Shim Wear; 3 μm |
| 14 | Zirconia | Same as above | Shim Wear; 3 μm |
| 15 | Alumina | Same as above | Shim Wear; 7 μm |

It can be seen from the results of Table 1 that the shims 5 having such shapes as shown in FIG. 3 (samples 6 to 10) and FIG. 4 (samples 11 to 15) in accordance with the embodiment of the present invention, in which side surfaces of shims 5 are so shaped as not to be in contact with edge 4d of open end 4c, clearly have the advantageous effects.

Consider an example in which shim 5 is manufactured using silicon nitride. To silicon nitride powder ($Si_3N_4$), 5 wt % of $Y_2O_3$ and 2 wt % of $Al_2O_3$ were added as sintering assisting agents, and the mixture was mixed for 96 hours in a ball mill, in ethanol. After drying, the resulting mixed powder was subjected to CIP (Cold Isostatic Pressing), sintered in a nitride gas atmosphere at a pressure of 2 atmospheres at 1710° C. for 4 hours, and thereafter subjected to HIP (Hot Isostatic Pressing) in a nitrogen gas atmosphere at a pressure of 1000 atmospheres at 1660° C., for 1 hour, whereby the mixed powder was formed to a sintered body.

The resulting sintered body had a ratio of 5% and linear density of crystal grains for the length of 50 μm was 153. Here, a ratio can be obtained as peak intensity ratio of diffraction lines (102)+(210) and (101)+(210) of (α-silicon nitride, α'-sialon) and (β-silicon nitride, β'-sialon): $\alpha[(102)+(210)]/\{\alpha[(102)+(210)]+\beta[(101)+(210)]\}$.

The sintered body of silicon nitride manufactured in this manner was subjected to 4-point bending strength measurement in compliance with JIS R 1601 "Method of Testing Fine Ceramics Bending Strength", and the bending strength was 1450 MPa. Commercially available silicon nitride used for samples 3, 8 and 13 of Table 1 had 4-point bending strength of 1050 MPa.

The silicon nitride manufactured under the above described condition was formed to the shape of shim 5 shown in FIG. 4, and this shim 5 and a shim 5 formed of commercially available silicon nitride represented by sample 13 of Table 1 were set in the test apparatus of FIG. 5. When the cycle speed of valve 2 reaches near 3500 cycles per minute, which corresponds to the rotation speed of the cam shaft inducing rattling, the shim 5 formed of commercially available silicon nitride was broken, while the shim 5 formed of silicon nitride manufactured under the above described condition was intact. Accordingly, the 4-point bending strength of the silicon nitride sintered body should preferably be 1000 MPa or higher and more preferably, 1300 MPa to 2000 MPa. Even when the bending strength is reinforced to be higher than 2000 MPa, the effect is not so significant as compared with the increase in the cost of the material powder and the cost of the sintering process.

Second Embodiment

The sliding part in accordance with an embodiment of the present invention used for a mechanism for preventing inclination of the ring gear in a reduction mechanism of a vehicle will be described in the following. Using commercially available silicon nitride, sliding parts 15 which correspond to sliding part 110 of FIG. 10C were formed to have the shape of the conventional sliding part 15 and the shapes of FIGS. 7 and 8 in accordance with the present embodiment, and shapes and effects of the sliding parts were evaluated.

The dimension of conventional sliding part 15 shown in FIG. 6 was as follows: D2φ=21 mm, h2=18 mm, H2=20 mm. The dimension of sliding part 15 in accordance with the embodiment of the present invention shown in FIG. 7 was as follows: D2φ=21 mm, h2=15 mm and H2=20 mm. The dimension of sliding part 15 in accordance with the embodiment shown in FIG. 8 was set similarly to that of FIG. 7. The sliding parts were prepared by finishing the sliding surfaces to be flat with a flatness of 2 μm by using a diamond grinder having a mean abrasive grain diameter of 8 to 12 μm, and other sliding parts were prepared to have the sliding surfaces finished to have convex crowning shapes of R800 and R1600 with a surface roughness of at most Ra=0.2 μm. The rear surface 107 of ring gears 105 formed of SCM420H was thermally treated to attain Rockwell Hardness of $H_{RC}$45 and finished to have a surface roughness of Ra=5 μm. The sliding parts 15 thus prepared were put in a differential case 104 of a truck for the load of 15 t, a lubricating oil in a condition corresponding to accumulated travel of 150,000 km was introduced, and the clearance δ was adjusted to be 0.2 mm, and then a quick start was repeated for 100 times. In this manner, the amounts of wear of rear surfaces 107 of ring gears 105 which were in contact with respective sliding parts 15 were evaluated, and the results are as shown in Table 2.

TABLE 2

Figure 6:
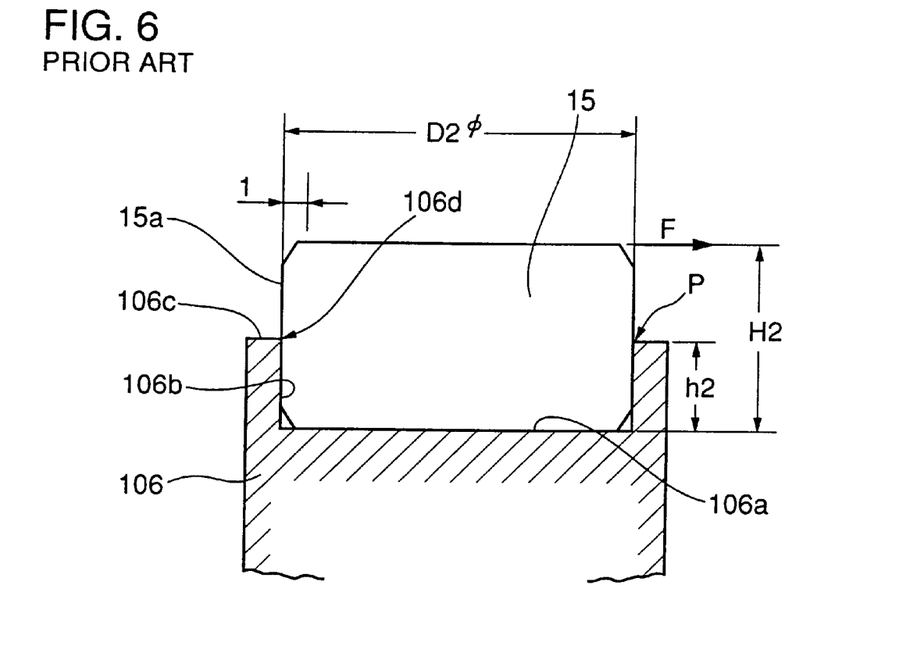
FIG. 6 is a cross section of a conventional sliding part seated in a recessed portion of a holding portion of a mechanism for preventing inclination of the ring gear in a conventional reduction mechanism.
Figure 7:
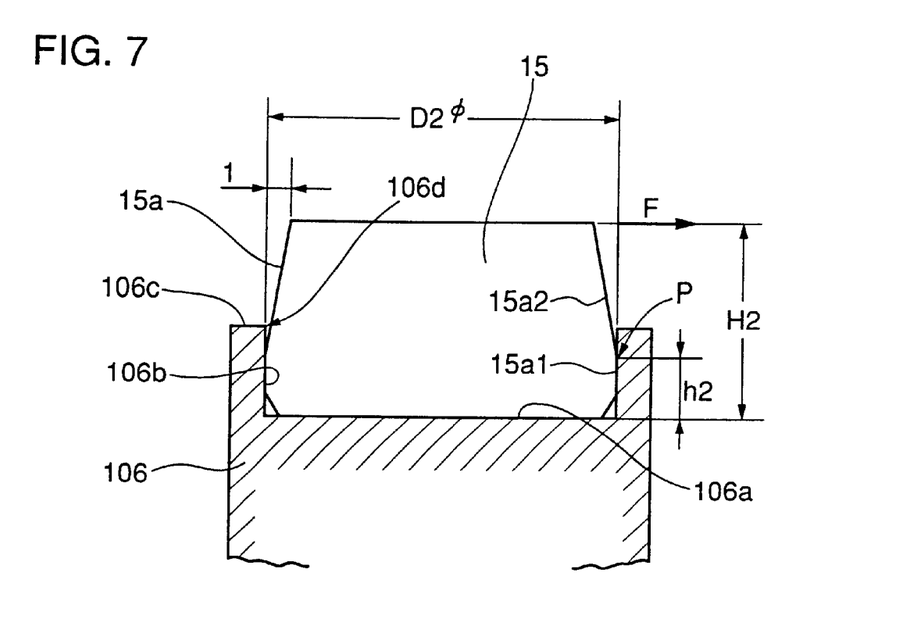
FIG. 7 is a cross section of a sliding part having a linearly inclined side surface in accordance with an embodiment of the present invention seated in a recessed portion of a holding portion of a mechanism for preventing inclination of the ring gear in the reduction mechanism.
Figure 8:
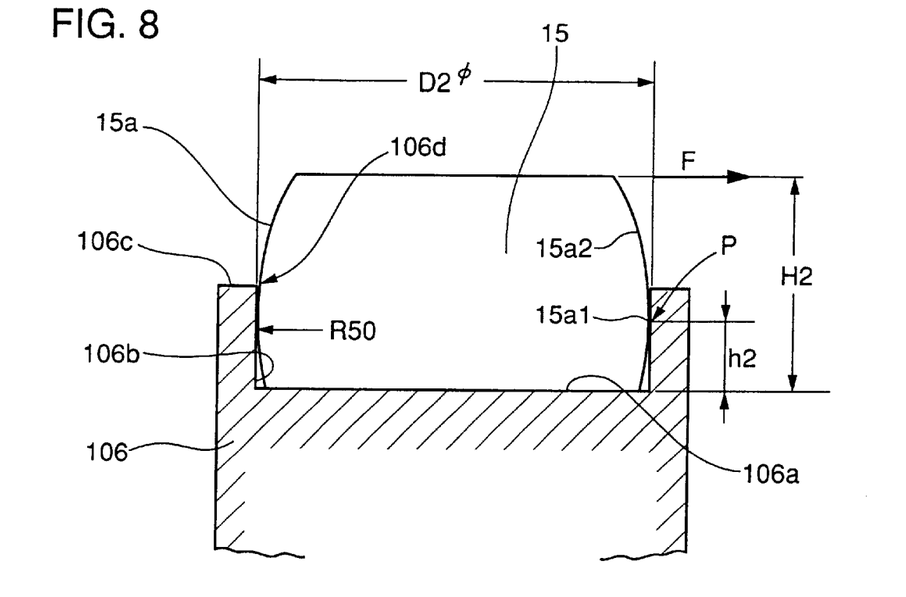
FIG. 8 is a cross section of a sliding part having curved columnar side surface in accordance with an embodiment of the present invention seated in a recessed portion of the holding portion of a mechanism for preventing inclination of the ring gear in the reduction mechanism.

| Sample No. | Sliding Surface | Shape | Test Result |
|---|---|---|---|
| 16 | Flat | FIG. 6 | Broken from point P after 20 quick starts |
| 17 | R800 | Same as above | Broken from point P after 41 quick starts |
| 18 | R1600 | Same as above | Broken from point P after 36 quick starts |
| 19 | Flat | FIG. 7 | Rear Surface Wear Amount; 216 μm |
| 20 | R800 | Same as above | Rear Surface Wear Amount; 23 μm |
| 21 | R1600 | Same as above | Rear Surface Wear Amount; 19 μm |
| 22 | Flat | FIG. 8 | Rear Surface Wear Amount; 226 μm |
| 23 | R800 | Same as above | Rear Surface Wear Amount; 25 μm |
| 24 | R1600 | Same as above | Rear Surface Wear Amount; 22 μm |

As can be seen from the results of Table 2, sliding part 15 having the shapes of FIG. 7 (samples 19 to 21) and FIG. 8 (samples 22 to 24) in accordance with the present embodiment, which have the side surfaces 15a including first side surface portions 15a1 that are adapted to be in contact with the inner wall 106b and second side surface portions 15a2 so shaped as not to be in contact with edge 106d of open end 106c of thrust bolt 106, clearly have the advantageous effects of their shapes. Further, it can be seen that the sliding surface of sliding part 15 should have convex crowning shape rather than flat shape, to attain improved wear resistance. Further, it can be seen that surface roughness of the sliding surface should be set to at most Ra=0.2 μm. When the sliding part in accordance with the present embodiment is used in a reduction mechanism of a vehicle, there is a clearance of 5 between sliding part 15 and the rear surface 107 of ring gear 105 in normal running, and therefore when sliding part 15 is held loose in the recessed portion 106a of thrust bolt 106, sliding part 15 plays in the clearance δ. In order to avoid unwanted wear, sliding part 15 should be integrally secured on thrust bolt 106 by shrink fit or press fit.

The following samples were prepared to evaluate the method of securing and the shapes and effects. Sample 18 of Table 2 corresponding to the conventional shape of sliding part 15 shown in FIG. 6, and sample 21 of Table 2 having the shape of sliding part 15 in accordance with the present embodiment shown in FIG. 7 were fixed on thrust bolt 106 with the margin for shrink fit of 60 μm and the margin for press fit of 20 μm.

Figure 9:
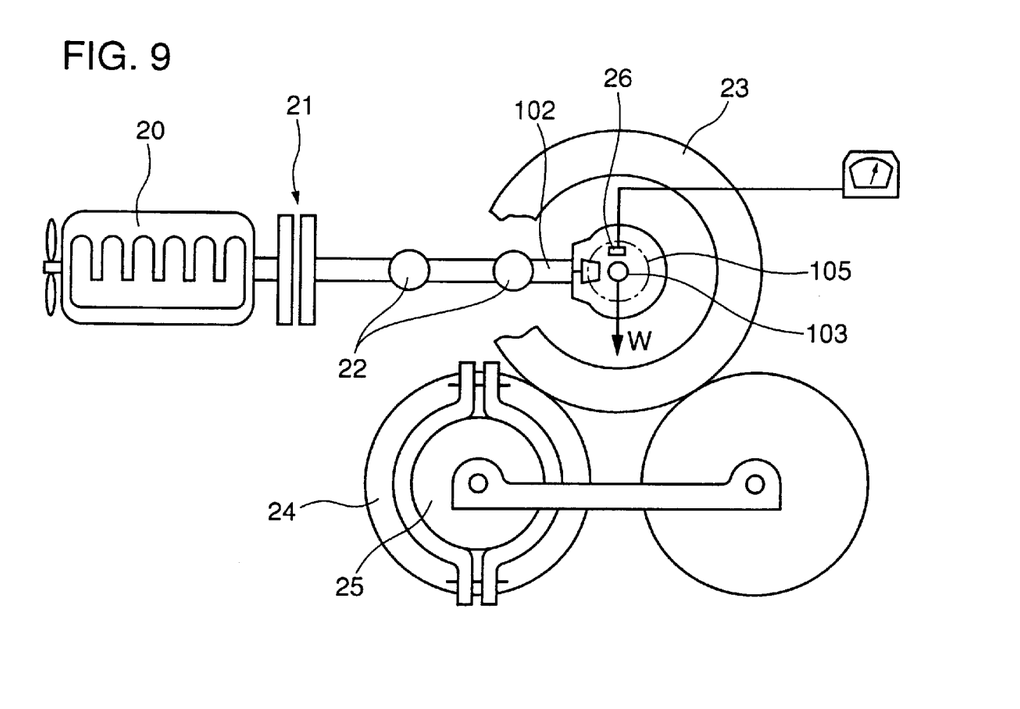
FIG. 9 is a schematic illustration of a dynamometer as an evaluating apparatus.

The samples were subjected to durability test using such a dynamometer as shown in FIG. 9 as an evaluating apparatus. An 8-cylindered, 16750 cc diesel engine 20 is used for the evaluating apparatus. A clutch 21 is provided at a tip end of an output shaft, and torque is transmitted from the output shaft through a coupling 22 to propeller shaft 102 including a pinion. The torque transmitted from propeller shaft 102 to ring gear 105 generates driving force to wheel 23, through axle shaft 103. The wheel 23 is attached to a torque generation drum 24, and load on engine 20 is controlled by a brake drum 25. When ring gear 105 deflects, contact force Q is measured by a strain gage 26 adhered to a support bolt (not shown).

Durability test was repeated for 1500 times while applying a load W corresponding to 15 ton on axle shaft 103 shown in FIG. 9 and connecting/disconnecting clutch 21. In the sample shown in FIG. 6 which had the shape of the conventional sliding part 15, a crack and breakage starting from the crack were observed at a portion where side surface 15a of sliding part 15 interfered with edge 106d of open end 106c of thrust bolt 106. Samples shown in FIG. 7 which had the shape of the sliding part 15 in accordance with the present invention were all intact.

After the end of the durability test, the sliding parts in accordance with the present embodiment were subjected to load test while controlling the contact force Q by monitoring strain gauge 26 and varying Hertz's contact surface pressure between 1100 MPa to 2100 MPa. As a result, it was found that when Hertz's contact surface pressure exceeded 2000 MPa, there was a breakage of sliding part 15 or a sign of pitching wear at that portion of ring gear 105 which slides over sliding part 15. Therefore, even for the sliding parts 15 having the shape in accordance with the present embodiment, a condition of use in which Hertz's contact surface pressure exceeds 2000 MPa is not preferable.

Here, "Hertz's contact surface pressure" in the present embodiment can be quantized by the following equation.

$$\sigma = 3Q/2\pi ab$$

where Q: contact force, a: longer radius of contact ellipse and b: shorter radius of contact ellipse.

The sliding part in accordance with the present invention has such a shape in that the side surface of the sliding part is not in contact with an inner wall edge of an open end of the holding portion, when the sliding part is secured in a holding portion formed of metal. As a result, stress concentration on the side surface of the sliding part can be relaxed, and premature breakage of the sliding part can be avoided. Thus a sliding part having superior wear resistance is provided.

Further, a sliding mechanism is provided in which the sliding surface of the sliding part preferably has a convex crown shape with the surface roughness of at most Ra=0.2 μm, which is preferably used under the optimal condition of use where Hertz's contact surface pressure is at most 2000 MPa.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sliding mechanism comprising:

a sliding part arranged to slide relative to a counter surface; and a metal holding member having an open end with a recess therein bounded by an inner wall of said holding member that meets said open end along an edge;

wherein said sliding part is arranged and held in said recess in said metal holding member and protrudes outwardly beyond said open end of said metal holding member;

wherein said sliding part has a side surface including a first side surface portion that contacts said inner wall in said recess away from said edge, and a second side surface portion that extends smoothly from said first side surface portion outwardly past said edge to protrude outwardly beyond said open end; and wherein said second side surface portion is spaced from said inner wall and is not in contact with said edge.

2. The sliding mechanism according to claim 1, wherein said sliding part is held loosely in said recess, and said first side surface portion contacts said inner wall movably with play.

3. The sliding mechanism according to claim 1, wherein said sliding part is held securely in said recess, and said first side surface portion contacts said inner wall tightly with a shrink fit or a press fit therebetween.

4. The sliding mechanism according to claim 1, wherein said second side surface portion has a linear tapering sectional shape.

5. The sliding mechanism according to claim 4, wherein said first side surface portion has a linear sectional shape joining said linear tapering sectional shape of said second side surface portion at an obtuse angle.

6. The sliding mechanism according to claim 1, wherein said second side surface portion has a curved tapering sectional shape.

7. The sliding mechanism according to claim 6, wherein said first side surface portion has a curved sectional shape joining said curved tapering sectional shape of said second side surface portion to form a smooth continuous curvature.

8. The sliding mechanism according to claim 1, wherein said sliding part consists of a ceramic.

9. The sliding mechanism according to claim 8, wherein said ceramic is a silicon nitride based ceramic.

10. The sliding mechanism according to claim 9, wherein said ceramic comprises a ceramic sintered body having an α ratio of 5% and a linear crystal grain density of 153 grains in a length of 50 μm.

11. The sliding mechanism according to claim 9, wherein said ceramic has a 4-point bending strength in a range from 1300 MPa to 2000 MPa.

12. The sliding mechanism according to claim 8, wherein said sliding part is an integral unitary sintered body of said ceramic.

13. The sliding mechanism according to claim 1, wherein said recess is further bounded by a bottom floor, and said inner wall of said recess has a straight linear sectional shape extending from said bottom floor of said recess to said edge at said open end.

14. The sliding mechanism according to claim 1, wherein said second side surface portion defines a smooth taper of said sliding part extending smoothly from said first side surface portion.

* * * * *

UNITED STATES PATENT AND TRADEMARK OFFICE
CERTIFICATE OF CORRECTION

PATENT NO. : 6,220,757 B1
DATED : April 24, 2001
INVENTOR(S) : Yamagiwa et al.

Page 1 of 1

It is certified that error appears in the above-identified patent and that said Letters Patent is hereby corrected as shown below:

Column 5,
Line 32, after "Here,", replace "a" by -- $\alpha$ --;

Column 6,
Line 59, after "of", replace "5" by -- $\delta$ --.

Signed and Sealed this

Twenty-seventh Day of November, 2001

Attest:

NICHOLAS P. GODICI
Attesting Officer    Acting Director of the United States Patent and Trademark Office